United States Patent [19]

Chih-Hung

[11] Patent Number: 5,692,952
[45] Date of Patent: Dec. 2, 1997

[54] AIR-CONDITIONED SEAT CUSHION

[76] Inventor: Ling Chih-Hung, No. 249, Ai Kuo Street, Feng Yuan City, Taichung Hsien, Taiwan

[21] Appl. No.: 595,325

[22] Filed: Feb. 1, 1996

[51] Int. Cl.⁶ .................................................. B60H 1/24
[52] U.S. Cl. ............... 454/120; 297/180.11; 297/180.13
[58] Field of Search .................................. 454/120, 907; 297/180.11, 180.13, 180.14

[56] References Cited

U.S. PATENT DOCUMENTS

| | | | |
|---|---|---|---|
| 2,992,604 | 7/1961 | Trotman et al. | 454/120 |
| 2,992,605 | 7/1961 | Trotman et al. | 454/120 |
| 3,030,145 | 4/1962 | Kottemann | 454/120 X |
| 3,162,489 | 12/1964 | Trotman | 454/120 X |
| 5,372,402 | 12/1994 | Kuo | 297/180.13 |
| 5,590,428 | 1/1997 | Roter | 297/180.13 X |

*Primary Examiner*—Harold Joyce
*Attorney, Agent, or Firm*—Pro-Techtor International

[57] ABSTRACT

An air-conditioned seat cushion having a top cushion with many protruded beads and supporting cylinders. The inlet on its rear end to be sewn and sealed with one containing bag having one filter net on its front surface and one blower inside it. The cool air drown in by the blower will run in the air passages among the supporting cylinders inside the cushion and flow among the protruded beads on the cushion and then overflow from the air outlets spread on the cushion to provide prompt cool ventilation.

4 Claims, 8 Drawing Sheets

AIR-CONDITIONED SEAT CUSHION

BACKGROUND OF THE INVENTION

An automobile under the sun for a long period of time in a hot weather is usually filled with burning heat making the seats hot with high temperature as high as 70°–80°C. on which are hard but have to be sat by the driver and the passengers getting in. Even though an expensive sunshade paper may be sticked on the windows of said automobile, the heat resisting power of said sunshade paper is reduced after exposing under the sun for a long period of time. Furthermore, the seats in said automobile are made of airtight material raising up the heat and humidity thereon because the heat and sweat from the human body sat thereon is gathered and accumulated thereon. Anyone who sits on the seat will feel very uncomfortable. If it is the driver who sits on the seat, a traffic accident may occur because the driver's concentration is distracted by his uncomfortable feeling.

The object of the present invention is to provide an air-conditioned seat cushion to held the one sat thereon feel cool with prompt cool air circulation without adding any compressor in said automobile excluding the defect as mentioned above.

The object of the present invention is to provide an air-conditioned seat cushion with cool air blowing in the multiple air passages among the supporting cylinders inside said cushion or flowing in the multiple protruded beads on said cushion and running out from the air orifices spread over said cushion making the one who sits thereon feel cool instantly.

The other object of the present invention is to provide an air-conditioned seat cushion which is light, thin and soft without installing any long conduit to transport the cool air reducing the cost and making the one who sits thereon feel confortable and cool during the drive.

DETAILED DESCRIPTION OF THE PREFERRED EMBODIMENT

Figure 1:
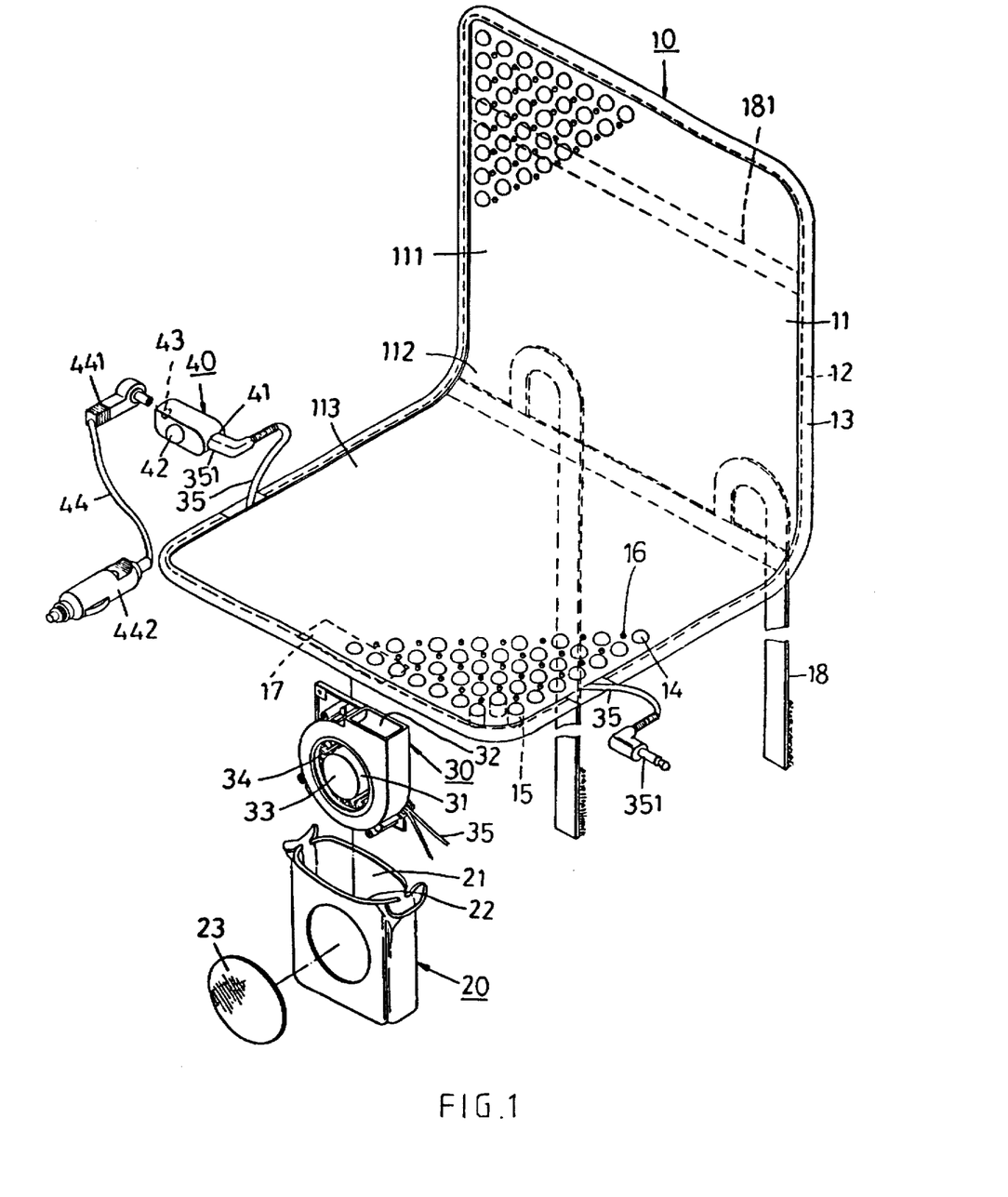
FIG. 1 is a perspective view of the present invention in disassembled mode.
Figure 2:
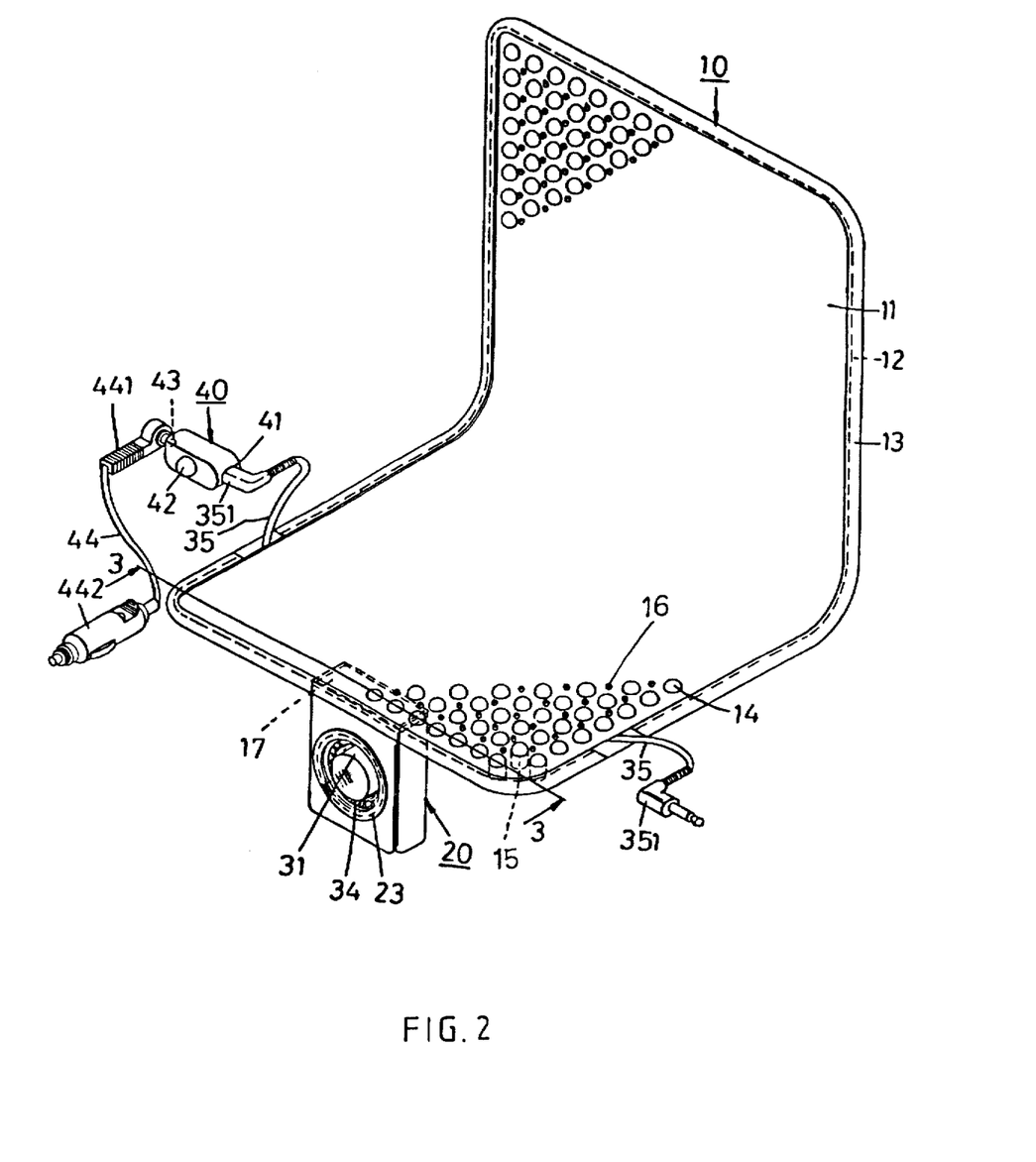
FIG. 2 is a perspective view of the present invention in assembled mode.
Figure 3:
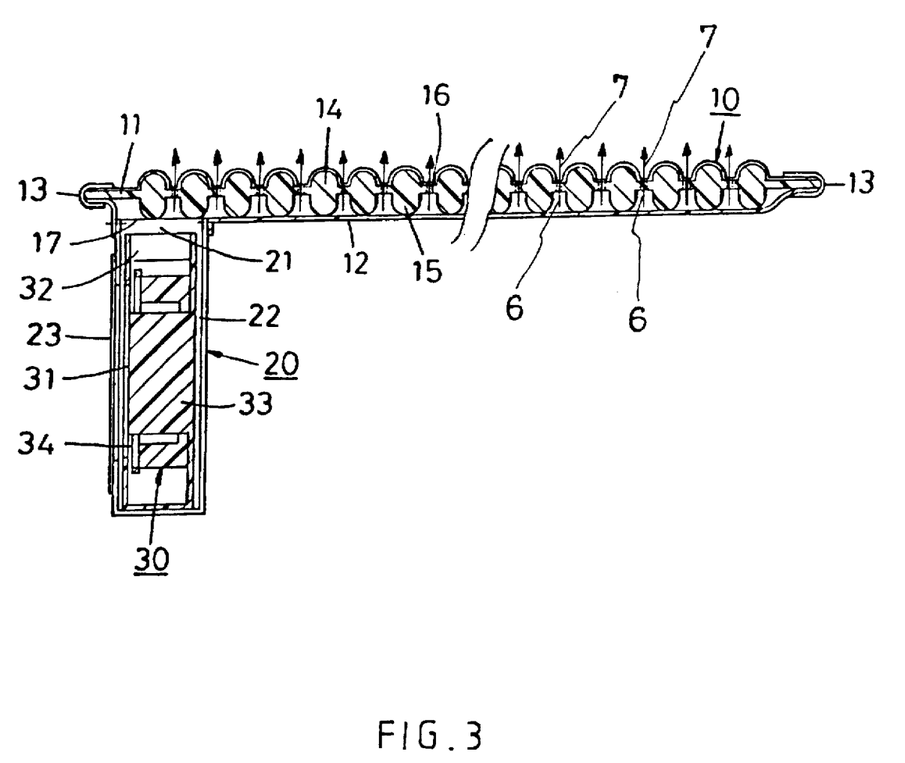
FIG. 3 is a cross-sectional view of the present invention.

Referring to FIGS. 1 and 2 which are the perspective view of the first embodiment of the present invention in disassembled and assembled mode that comprises one cushion 10, one containing bag 20, one blower 30 and one variable resistor 40 wherein said cushion 10 having one top cushion 11 and one bottom cushion 12 integrally molded with the material of the half soft airtight leather cloth molded by PVC, EVA or the like or injected plastics or foam rubber, etc. thereon. The hem around both the top cushion 11 and the bottom cushion 12 has a certain width preserved for the hemming wrapper 13 to sew up thereon. Referring to FIG. 3, both the top and bottom side of said top cushion 11 have the protruded beads 14 and the supporting cylinders 15 of the same length, width, height and interval interspersed thereon. The multiple air passages are formed among said protruded beads 14 and said supporting cylinders 15 on and under the surface of said cushion 10 and the air interspace is formed among said supporting cylinders 15 inside said cushion 10. Referring to FIG. 1, said cushion 10 has many air outlets 16 whose number and size are in corresponding to the volume of the air blown out from them interspersed vertically and horizontally among said protruded beads 14 by turns. Said bottom cushion 12 has one air inlet 17 on its front rim under the seat and two elastic ribbons 181 on its upper part and lower part separately fastening said cushion 10 on the seat with another two elastic ribbons 18 extending from the elastic ribbon located on its lower part with proper distance in the between whose other ends under the seat have the male touch fastening belts to be fastened on the female touch fastening belts on whose middle part after winding around the metal ribs supporting the seat to fasten said cushion 10 on the seat and to prevent it from sliding or moving.

Said containing bag 20 has one opening 21 on its top and one containing space 22 inside and one filter net 23 covering the middle-sized round hole on its front surface to filter the air sucked in and to prevent anyone from hurt by carelessly touching the device contained therein. Said filter net 23 linking with said containing space 22 is airtightly connected to the rim of the air sucking inlet 31 preventing the air from leaking.

Said blower 30 hung on the front end of the bottom cushion 12 mainly comprises one ball or sleeve motor driving multiple bladed whirling fan located in the containing space 22 inside the Containing bag 20 whose opening 21 is sewn and sealed with the air inlet 17 on the front end of the bottom cushion 12. Said blower 30 has one air sucking inlet 31 on its front facing the round hole on the front surface of the containing bag 20 covered by the filter net 23 and one air blowing outlet 32 on its top connected to the air inlet 17 under the seat on the front rim of the bottom cushion 12. Said blower 30 has one air sucking inlet 31 with one multiple bladed whirling fan 34 driven by the ball or sleeve motor 33 which has one or more sets of electric cords 35 in parallel extending from either the left or the right side of the cushion 10 with one contact plug 351 on the other end. The volume of the air blown from the air blowing outlet 32 of the blower 30 is determined by the the number and size of the air outlets 16 interspersed on the cushion 10. The formal size of the blower 30 is 120 mm×120 mm×32 mm with an average life of 38000 hours under room temperature and an average electric consumption of 7.2 W and an average electric current of 0.6 which is calculated based on the specific electric current of 50A of the battery on the automobile and an average noise value around 50 dBA which is calculated based on the noise made by a slow run automobile engine of about 60 dBA.

Said variable resistor 40 has one plug hole 41 on its one side opposite to the electric socket 43 on its other side for electricity supply and one adjusting bottom 42 on its another side for adjusting the volume of the blowing air. Said plug hole 41 and said electric socket 43 are connected through the electric circuit inside said variable resistor 40. Said plug hole 41 is to be inserted by the contact plug 351 of the blower 30 and said electric socket 43 is to be inserted by the plug 442 on the one end of the extension line 44 whose other end located one cigar-shaped plug to plug into the cigarette lighting device on the automobile for electricity supply not shown in the figures.

Figure 4:
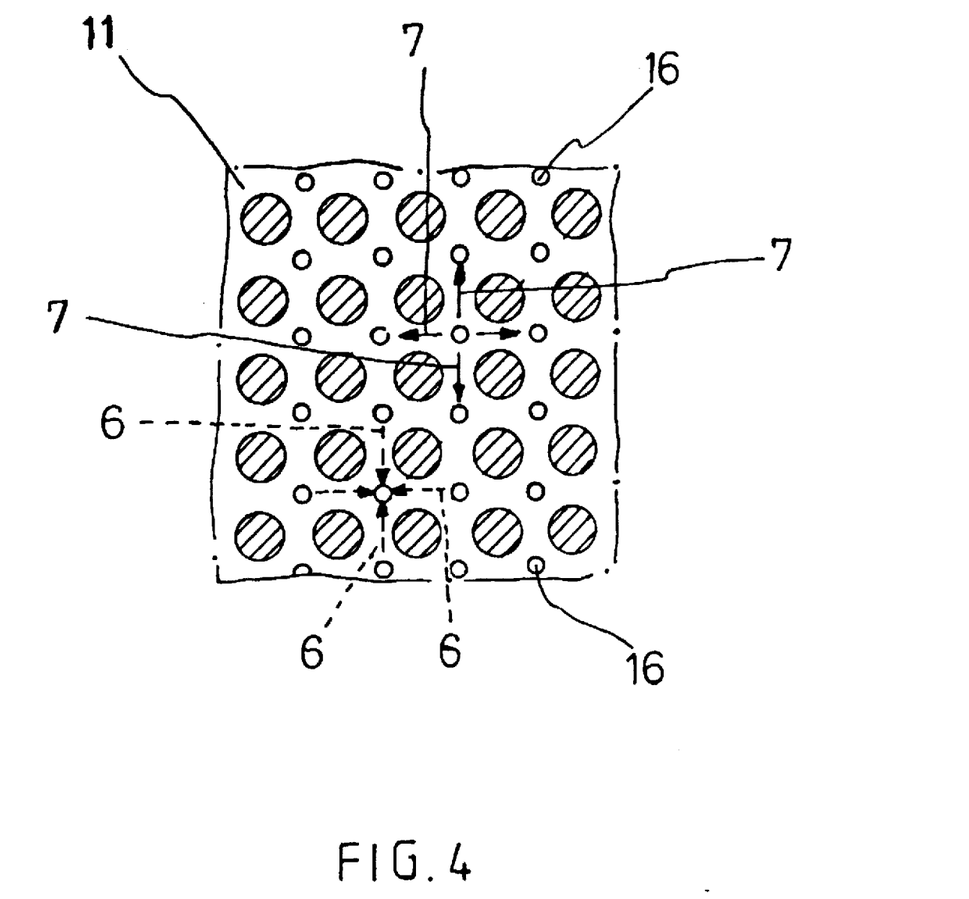
FIG. 4 is an enlarged cross-sectional view of the air of the present invention flowing from the air inlet runing in the air passages among the supporting cylinders inside the cushion and then overflowing from the air outlets spread on the cushion after being sat and pressed by a human body runing in the air passages among the protruded beads.

The present invention is assembled as follows:

The back of the cushion 10 of the present invention is fastened on the seat back by the elastic ribbon 181 to wrap thereon. The bottom of said cushion 10 is fastened on the seat bottom by the touch fastening belt 18 after winding thereon. The blower 30 is hanged on the front rim of the seat and between the legs of the one who sits thereon. If the one who sits on the cushion is wearing a long skirt, she may push aside the blower. The cigar-shaped plug 442 with a fuse wire inside for security may be retained at normal time in the cigarette lighting device on the automobile for electricity supply not shown in the figures. Once a driver enters the automobile under burning heat, he may start said automobile whose engine will provide electricity to generate the blower 30 to drive away the heat absorbed by the cushion 10. When the space inside said automobile is filled with cool air, the cool air may be carried through the filter net 23 on the containing bag 20 passed through the air sucking inlet 31 of the blower 30 blown through the air inlet 17 of the cushion 10 after turning 90 degree from the air blowing outlet 32 providing bigger volume of air spread inside the cushion 10. The air blown in the cushion 10 running freely in the air passages among the supporting cylinders 15 on the bottom side of the top cushion 11 is overflowed out from the air outlets 16 running among the protruded beads 14 on the top cushion 11 to provide a cool enviornment. The air 6 blown in from the air inlet 17 flowing around the supporting cylinders 15 on the bottom side of the top cushion 11 and the air 6 overflowed out from the air outlets 16 being pressed by a person sat thereon become the air 7 flowing around the protruded beads 14 on the top side of the top cushion 11 as shown in FIGS. 3 and 4.

The volume of the air overflowed from the air outlets 16 on the cushion 10 can be adjusted by the adjusting button 42 on the variable resistor 40. The contact plug 351 connected to the variable resistor 40 and the extension line 44 may stretch out from either the right side or the left side of the cushion 10 according to the location of the cigarette lighting device which is to be plugged in by the cigar-shaped plug 442 on the other end of the extension line 44.

The present invention is also applied to the warm air supplied in a cold weather. It can not only help the people who sits thereon to remove the hot feeling but also help those who need to sit on his seat for a long period of time during his work or those who suffer from piles or those who have to sit on wheelchairs merely replacing the extension line 44 with an adaptor.

Figure 5:
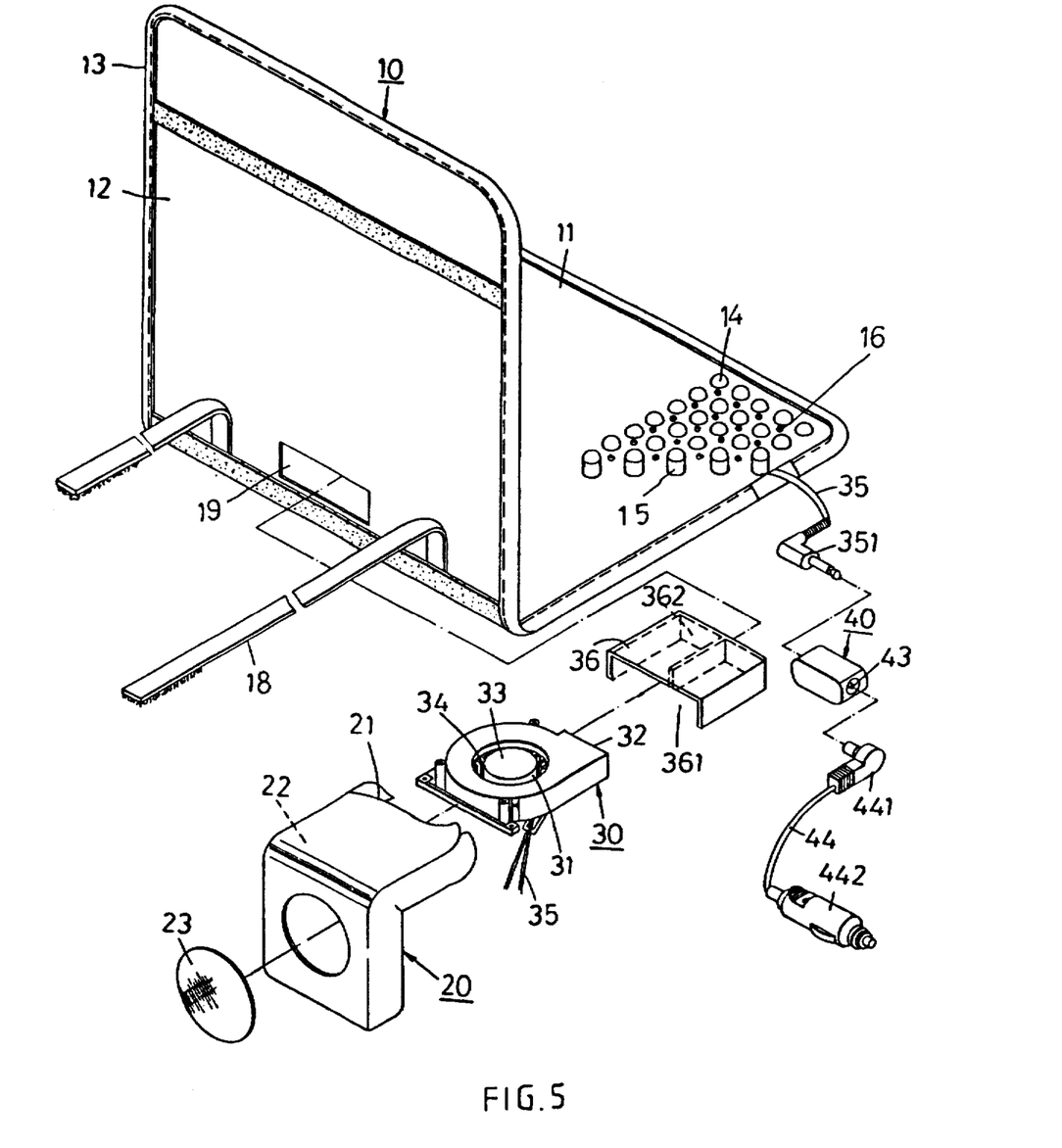
FIG. 5 is a perspective view of the second embodiment of the present invention in disassembled mode.

Referring to FIG. 5, it is a perspective view of the second embodiment of the present invention in dissambled mode.

Figure 6:
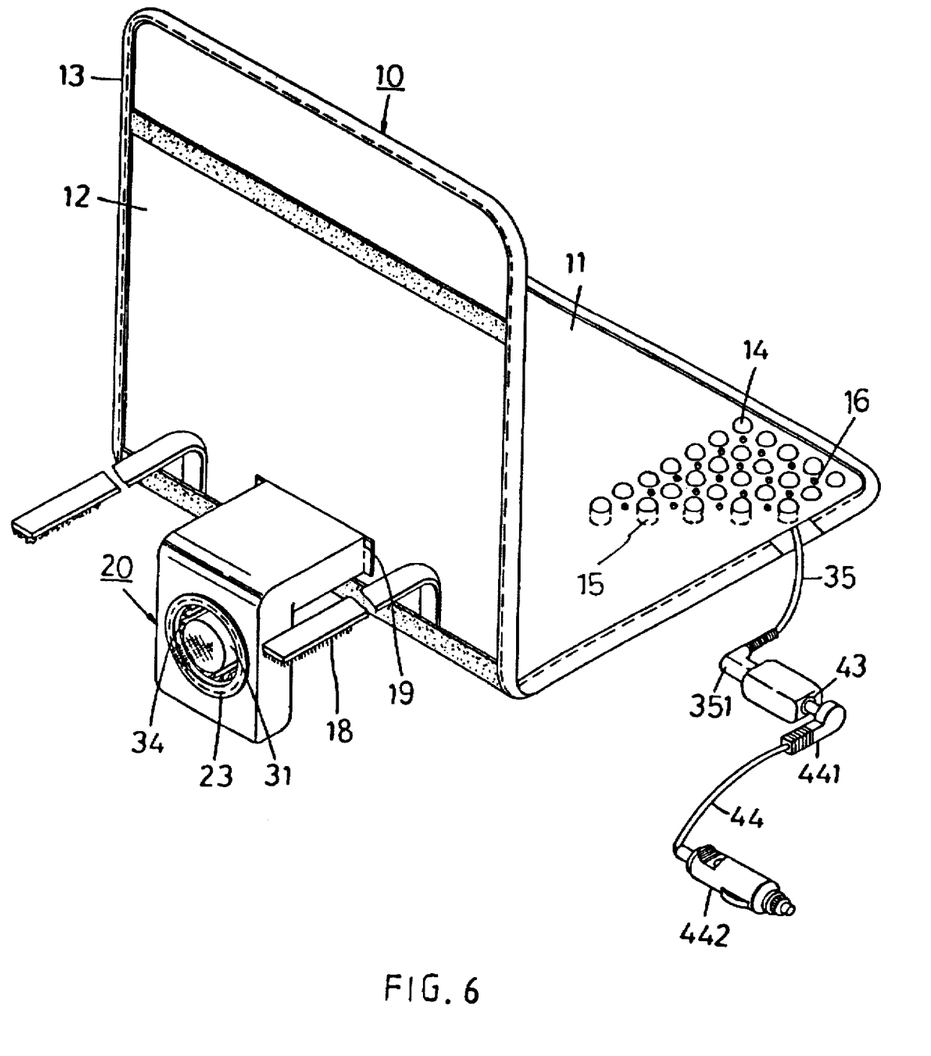
FIG. 6 is a perspective view of the second embodiment of the present invention in assembled mode.
Figures 7, 7A:
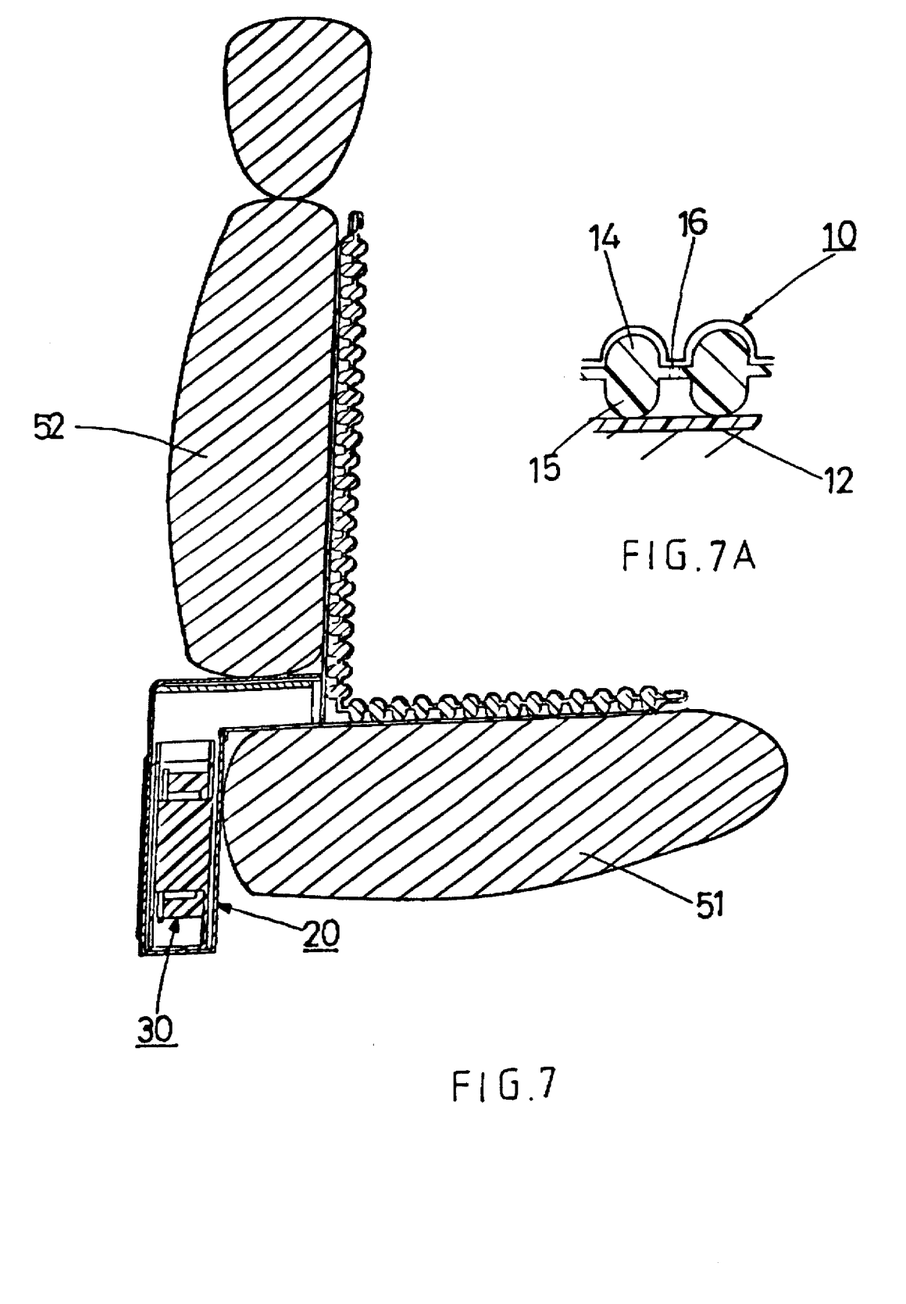
FIG. 7 is a cross-sectional view of the second embodiment of the present invention installed on a seat.
FIG. 7A is an enlarged corss-sectional view of the protruded beads and the supporting cylinders.

Said cushion 10 has one air inlet 19 on the lower middle part of the bottom cushion 12 or other hem part thereof for the installation of the blower 30 connected to the blast pipe 36 to be contained in the containing bag 20 whose opening 21 is sewn and sealed with the hem surrounding the air inlet 19. The air blowing outlet 32 on the top of the blower 30 is facing the air orifice 361 on one side of the blast pipe 36 on whose other side being one air orifice 362 facing the air inlet 19 on the cushion 10 to connect with the air interspace therein. Referring to FIGS. 6 and 7, the present invention is installed on the seat 51 inside an automobile and the space inside the automobile is filled with cool air to be drawn in through the filter net 23 on the containing bag 20 and passed through the air sucking inlet 31 of the blower 30 and then through the air blowing outlet 32 and the air inlet 19 to run inside the cushion 10. The air runs in the air passages among the the supporting cylinders 15 on the top cushion 11 and then overflows from the air outlets 16 on the top cushion 11 to run around the protruded beads 14 providing cool ventilation.

The material of which the present invention is made tends to be soft, so the size (thickness), number and interval of the multiple protruded beads 14, supporting cylinders 15, air outlets 16 and air inlets 17 and 19 will vary accordingly. Basically the material chosen will make the one who sits thereon feel most comfortable during his ride and bring out the biggest volume of air blown out from the air outlets 16 while the top cushion 11 will not sink by the one who sits thereon and it is convenient for use.

Figure 8:
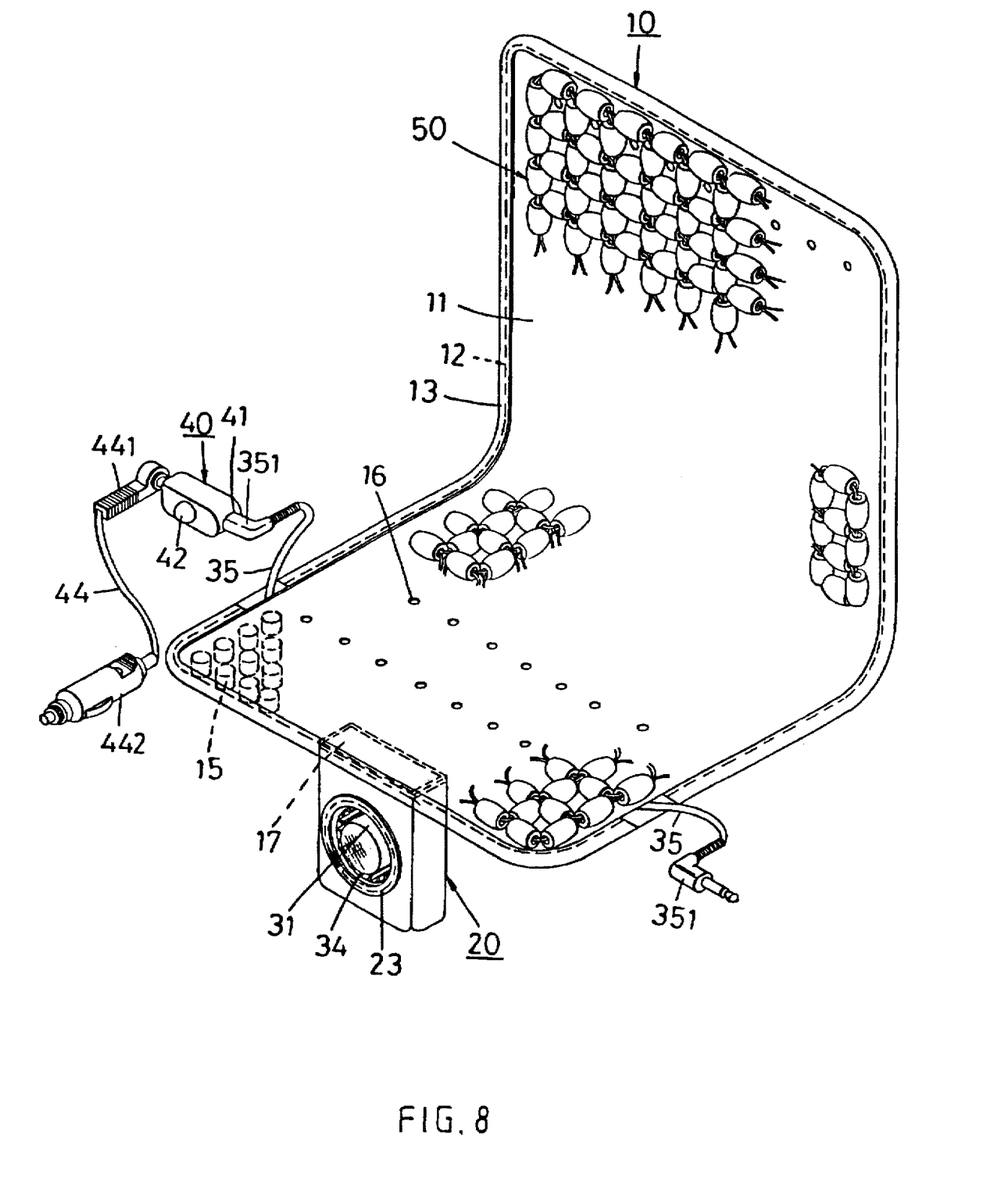
FIG. 8 is a perspective view of the third embodiment of the present invention.

Furthermore, a third embodiment of the present invention having beautiful look, being easily cleaned and uneasily got dirty is shown in FIG. 8. The top cushion 11 has a flat surface and the cushion 10 is made of a half soft airtight material. Said top cushion 11 is covered with the beads-woven carpet 50 on its surface and with the supporting cylinders 15 of specific intervals under its surface. Among said supporting cylinders 15 from the multiple air passages on the bottom side of the top cushion 11 which is covered with many air outlets 16 to exhaust the cool air flowing inside the cushion 10 providing a cool ventilation making the one who sits thereon feel comfortable during his ride. This embodiment replace the protruded beads 14 with the bead-woven carpet 50 being variform and easily cleaned.

The present invention is to provide prompt circulation of cool air with the protruded beads, the beads-woven carpet and the supporting cylinders hard enough to support the weight of the human body who sits thereon. The air passages among the supporting cylinders inside the cushion and the air passages among the protruded beads or the beads-woven carpet for the cool air flowing therein will not be effected by the weight of the human body. The blades of the whirling fan driven by the ball or sleeve motor inside the blower may be more than a dozon pieces cutting the air into vary small volume and lowering the noise it makes than the noise made by the slow run automobile engine with electric consumption being 2% of the battery on the automobile and with great volume of blowing air from the air blowing outlet, therefore, it is quiet, convenient, easily formed and power saving.

What is claimed is:

1. An air-conditioned seat cushion comprising:
   at least one cushion element which includes on a top side thereof a plurality of protruding beads and supporting cylinders beneath said top side, said supporting cylinders being spaced to form air passages therebetween, said top side of said cushion element includes a plurality of air outlets interspersed between said beads, and an air inlet formed in said cushion element,
   a blower affixed to said cushion element, said blower is contained in a containing bag, an air inlet of said blower is covered by a filter element, said blower being in communication with said inlet of said seat cushion element, a variable resistor electrically connected to said blower for adjusting the speed thereof, a power source electrically connected to said variable resistor for supplying power to said blower, and securing means to secure said seat cushion to a seat; wherein said blower draws ambient air through said air inlet, said air then flows through said air passages and out of said air outlets, thereby providing a cooling effect on a user of said seat cushion.

2. The seat cushion of claim 1 wherein:

said power source is adapted to draw power form a cigarette lighter of an automobile.

3. The seat cushion of claim 1 wherein:

said blower is a fan including a plurality of blades.

4. The seat cushion of claim 1 wherein:

said securing means comprises a plurality of straps.

* * * * *